United States Patent [19]

Townsend et al.

[11] 4,137,449

[45] Jan. 30, 1979

[54] TRACKING MOUNT ASSEMBLY

[75] Inventors: Robert H. Townsend, Richardson; Barry C. Kockler, Lewisville, both of Tex.

[73] Assignee: Xerox Corporation, Stamford, Conn.

[21] Appl. No.: 763,485

[22] Filed: Jan. 28, 1977

[51] Int. Cl.² .................... G06K 13/06; G06K 7/08
[52] U.S. Cl. .................................. 235/485; 235/449; 400/73
[58] Field of Search .................. 197/1 R, 19, 127 R, 197/133, 135 R, 136, 82; 340/146.3 C, 174 R; 400/73; 235/449, 485

[56] References Cited

U.S. PATENT DOCUMENTS

| | | | |
|---|---|---|---|
| 3,222,460 | 12/1965 | Albanes et al. | 179/100.1 D |
| 3,260,340 | 7/1966 | Locklar et al. | 197/19 |
| 3,674,125 | 7/1972 | Kolpek | 197/19 |
| 3,978,964 | 9/1976 | Kwan | 197/127 R |

Primary Examiner—Paul T. Sewell

[57] ABSTRACT

A tracking mount assembly is provided for use with an electronic typewriter magnetic card support platform having a top surface and a card guide surface thereon. The tracking mount assembly includes a bridge frame with a lead screw and a guide shaft mounted in the frame. A pair of lugs extend from the frame and are formed with alignment surfaces thereon. The alignment surfaces of the lugs engage the card guide surface of the card support platform to align the lead screw and guide shaft relative to the card guide surface. The lead screw and guide shaft are further aligned relative to the plane of the top surface of the card support platform by the connection between the bridge frame and the card support platform.

4 Claims, 10 Drawing Figures

TRACKING MOUNT ASSEMBLY

BACKGROUND OF THE INVENTION

The present invention relates to a magnetic card transport system for electronic typewriters and more particularly to a card transport system having prealigned components.

An electronic typewriter provides the capability of recording and storing information from the typewriter on magnetic cards. The information may later be read by the machine and used to control the operation of the machine.

Information is applied to and read from the card along discrete flux lines extending longitudinally on the surface of the card and spaced across the width of the card. The information is applied to or read from the card by the use of a magnetic head which scans the surface of the card as the card is moved back and forth under the magnetic head. The magnetic head is moved across the width of the card from one flux pattern to the adjacent flux patterns. For the magnetic head to perform a read or write function from a magnetic card, the magnetic head must be accurately set relative to the flux patterns on the card along three axes of orientation, that is with respect to the roll, pitch and skew or azimuth axes relative to the planar surface of the card. Additionally, because the card and the information stored thereon must be interchangeable from machine to machine such that information may be applied to a card by one machine and read from the card by a second machine, the flux patterns on the card must be along predetermined axes over the width of the card. Further, because of the critical nature of the relationship between the card and the magnetic head which performs both read and write functions, the mechanism for driving the card forward and back under the magnetic head must be accurately aligned relative to the transport axis along which the card is moved so as not to interfere with the relationship between the card and the magnetic head.

In prior art electronic typewriters, the critical relationship between the magnetic head and card and between the magnetic card and the drive assembly for driving the card longitudinally under the magnetic head have been accurately preset at the factory when the machine is put into operation. However, none of the prior art systems have provided an accurate and quick method for resetting the relationship between these elements once one of the components or components relating to the operation of one of these elements has been removed or altered as during replacement or repair. Heretofore, whenever the magnetic head or the structure supporting the magnetic head for movement laterally across the width of the card is removed for repair or replacement, the realignment of the magnetic head along the three axes of adjustment has required excessive time and labor. Without the advantage of having the factory fixtures and adjustment equipment in which the head is originally set, the requirement that the head be properly adjusted in roll, pitch and skew or azimuth has required substantial service time and in many cases, where sufficient care has not been taken, the setting or adjustment has not been adequate for the proper operation of the machine.

The adjustment required is critical in that the alignment of the magnetic head in skew or azimuth must generally be within nine minutes of perfect adjustment. Moreover, the sensitive surface of the magnetic head must be within thirty millionths of an inch of the upper surface of the magnetic card from which information is being read or to which information is being applied.

Additionally, the magnetic head must be settable along predetermined axes across the width of the magnetic card to correspond to the standard flux pattern locations and flux azimuth coincidence to facilitate and make possible interchangeability of cards from one machine to another. The magnetic head must generally be within two thousandths of an inch of predetermined flux pattern locations across the width of the card and nine minutes of arc azimuth in flux coincidence.

In the past, setting the magnetic head at appropriate flux pattern positions has been accomplished by the use of what is known in the trade as a CE card. With a CE card, standard flux patterns are "read" from the card and a field serviceman makes the appropriate adjustments of the magnetic head position along the transverse width of the magnetic card. This procedure, in addition to being subject to great inaccuracy either from failure to properly "read" the CE card or as a result of the use of old or damaged CE cards, is a very tedious and time consuming operation. As a result, such a technique has been completely inadequate in providing a simple and accurate method for assuring the proper adjustment of the magnetic head with relation to the magnetic card. Further, the ability to read a CE card successfully was not a guarantee of interchange capability due to possible minor but significant difference in CE cards written on different card master programmers.

Additionally, the alignment of the driving mechanism for moving the card longitudinally past the magnetic head has been strictly a mechanical adjustment requiring the serviceman to make the adjustments individually on a machine by machine basis. Because of the accuracy required for the proper operation of an electronic typewriter or similar machine using a magnetic head for reading or writing from or to a magnetic card, these mechanical adjustments have been completely unacceptable in meeting the need for a quick and accurate readjustment of the elements in the system subsequent to removal or repair of one of the elements of the system.

SUMMARY OF THE INVENTION

The present invention provides a system for overcoming many of the disadvantages found in the prior art and specifically provides a card transport system for use with an electronic typewriter in which the components are preset one to the other such that removal and repair of one component does not require excessive readjustment after repair or replacement of the components.

The transport system includes a card support platform with a tracking mount assembly attached to the top and a card drive assembly attached to the bottom. The card support platform has a guide rail extending upwardly therefrom having a card guide surface thereon for engagement by a longitudinal edge of the magnetic cards used in the system. A pair of locating arms extend downwardly from the card support platform and have inwardly directed faces accurately positioned relative to the card guide surface. These locating arms position the card drive assembly relative to the card support platform.

The tracking mount assembly receives and supports a magnetic head assembly and includes a bridge frame with four legs extending therefrom for mating with the card support platform. The frame has a pair of alignment lugs which extend downwardly therefrom such that outwardly facing surfaces may be positioned in contact with the card guide surface. A stepper motor and a lead screw extending therefrom are fastened to the frame of the tracking mount assembly. A guide shaft is also supported from the bridge frame in a parallel arrangement to and in the same horizontal plane as the lead screw. The lead screw and guide shaft are aligned relative to the card guide surface by mounting the bridge frame onto the card support platform with the alignment lugs in surface contact with the card guide surface. Because of the controlled relationship between the lead screw and guide shaft relative to the alignment lugs, the lead screw and guide shaft are automatically aligned relative to the card guide surface by this assembly. Likewise, the lead screw and guide shaft are automatically aligned relative to the plane of the card support platform by the points of connection between the frame and card support platform. Further, the angular relation of the lead screw relative to the card guide surface is set by angularly positioning the stepper motor relative to the bridge frame.

A magnetic head assembly including a magnetic head and a magnetic head support are receivable onto the lead screw and guide shaft for stepped slidable movement across the card support platform by the actuation of the stepper motor. The magnetic head support includes a magnetic head unit supporting the magnetic head and flexibly attached by resilient leaf springs to a lead screw attachment unit. The magnetic head unit includes a lower platform adjustably connected to an upper platform. The magnetic head is rigidly fixed in a clip which is attached to the lower platform. The clip is made to permit the adjustment of the clip and magnetic head about an axis perpendicular to the plane of the lower platform. In this way, the skew or azimuth of the magnetic head may be adjusted relative to the lower platform and ultimately relative to the magnetic card used in conjunction with the magnetic head.

The lower platform may be adjusted relative to the upper platform to adjust both the roll and pitch of the magnetic head. The magnetic head is positioned in azimuth angle during the attachment of the head into the lower platform. The lead screw attachment unit has a forward threaded portion threaded to mate with the threads of the lead screw. The attachment of the lead screw attachment unit to the magnetic head unit is such that the threads of the threaded portion are transverse to the longitudinal axis of the magnetic head assembly. The lead screw attachment unit is also formed with guideways for receiving the guide shaft therein. The guideways are formed on an axis substantially parallel to the axis of the threaded portion. An engaging foot is supported from a shaft extending through an aperture in the lead screw attachment unit and is biased upwardly to engage the threaded portion and the guideways of the lead screw attachment unit against the lead screw and the guide shaft and acts both to ensure engagement and accommodate wear during the life of the unit.

Therefore, the present invention provides a magnetic head assembly which can be accurately adjusted at the factory relative to the threaded portion of the lead screw attachment unit and relative to the guideways formed in the lead screw attachment unit. Using an appropriate fixture at the factory, the pitch, roll and skew or azimuth of the magnetic head may all be adjusted relative to the points of attachment between the magnetic head assembly and the tracking mount assembly. Thus, when the magnetic head assembly is in need of repair, a preset assembly may be substituted by the engagement of the threaded portion and guideways onto the lead screw and guide shaft without requiring adjustment as to the pitch, roll and skew or azimuth of the magnetic head. Moreover, by controlling the alignment of the tracking mount assembly to the magnetic card guide surface, the proper roll, pitch and skew or azimuth alignment of the magnetic head relative to the magnetic card is automatically assured.

The magnetic head assembly is also provided with an adjustment screw permitting the vertical adjustment of the magnetic head relative to the card support platform. A second adjustment is provided to permit the control of the contact pressure between the magnetic head and the magnetic card. These two adjustments may readily be made after the mounting of the magnetic head assembly on the tracking mount assembly.

The card drive assembly includes a frame for attachment to the underside of the card support platform. A motor is attached to the frame and has a drive shaft operatively connected to a drive wheel. The platform has an aperture formed therein corresponding to the location of the drive wheel when the card drive frame is attached to the card support platform. The card drive wheel is accurately positioned parallel to one of the outer facing surfaces of the card drive frame by presetting the drive wheel axle perpendicular to the face. This face is made for abutting engagement with the inner facing surfaces of the pair of locating arms extending downwardly from the card support platform. The surfaces of these arms are in turn appropriately aligned and preset relative to the card guide surface of the platform. Therefore, by simply butting the control surface of the card drive frame against the inwardly facing surfaces of the locating arms extending from the card support platform, the drive wheel axis is positioned perpendicular to the longitudinal axis of a magnetic card aligned with its edge against the card guide surface. Thus, the drive wheel, rotating of the shaft, is positioned such that its tangential rotation is aligned with the longitudinal axis of the magnetic card. As a result of this arrangement, when the card drive assembly is removed for repair or replacement, the only adjustment necessary to align the assembly relative to the longitudinal axis of the magnetic cards used in the system is to assure the surface contact between the control surface of the card drive frame and the inwardly facing surface of the locating arms extending from the card support platform.

The card drive frame is also adjustable relative to the plane of the card support platform such that the periphery of the drive wheel is tangential to the card support platform plane. In this way, a card positioned on the card support platform may be driven by the drive wheel without deforming or lifting the card from the card support platform surface.

BRIEF DESCRIPTION OF THE DRAWING

For a more complete understanding of the present invention, and for further details and advantages thereof, reference is now made to the following description taken in conjunction with the accompanying drawing, in which.

DESCRIPTION OF THE PREFERRED EMBODIMENT

Figure 1:
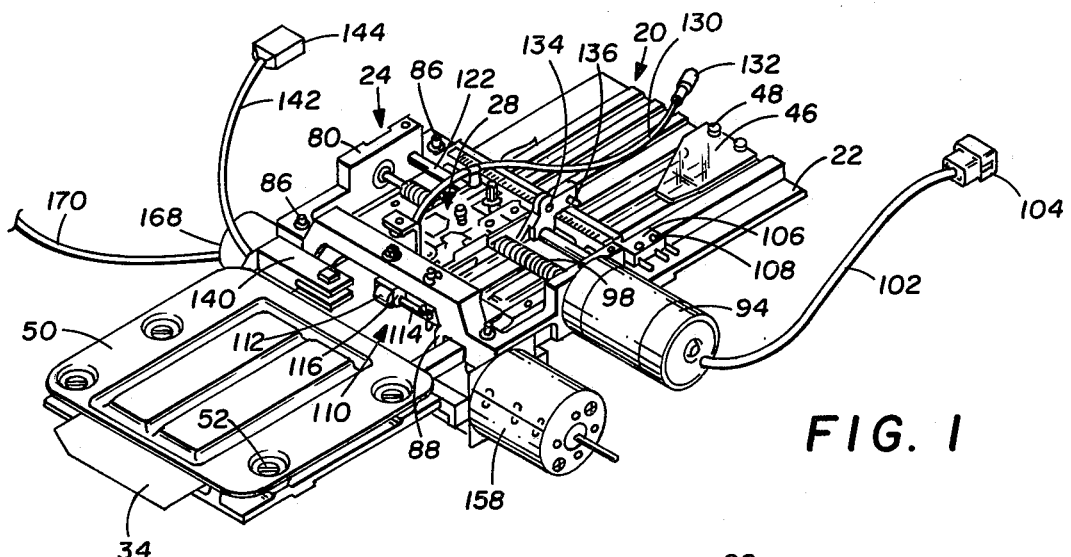
FIG. 1 is a perspective view of the magnetic card transport system of the present invention.
Figure 2:
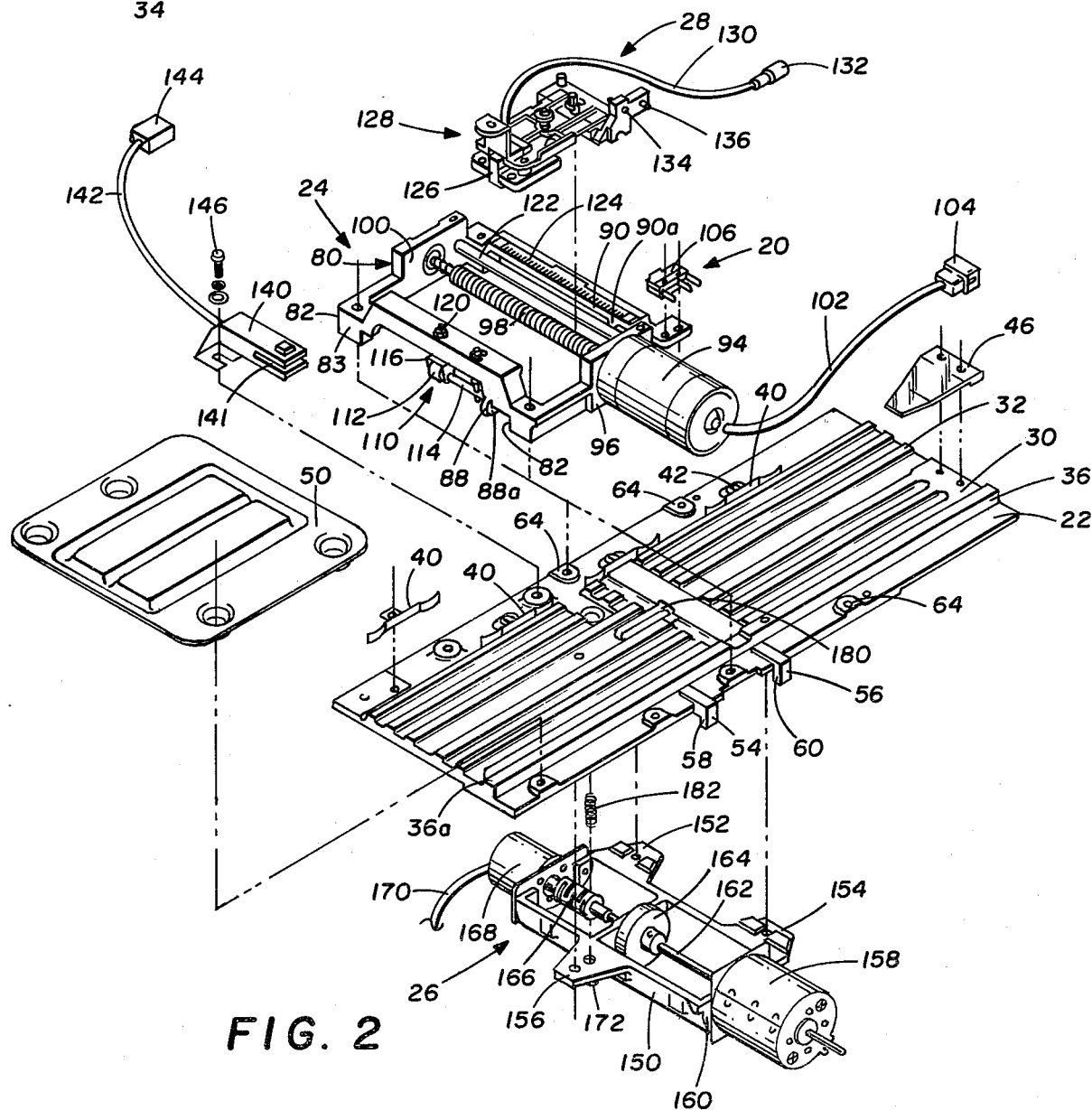
FIG. 2 is an exploded view of the card transport system illustrated in FIG. 1.

FIGS. 1 and 2 illustrate in assembled and exploded views, respectively, the magnetic card transport system of an electronic typewriter embodying the present invention. Referring to FIGS. 1 and 2, the transport system, identified generally by the reference numeral 20, includes a frame 22 which receives a tracking mount assembly 24 from above and a card drive assembly 26 from below. Tracking mount assembly 24 receives and supports a magnetic head assembly 28.

Frame 22 includes a card support platform 30 having a plurality of ribs 32 extending upwardly from the support platform 30 and along the longitudinal length thereof. Ribs 32 support a magnetic card 34 as will be hereinafter described in greater detail. A card guide rail 36 extends upwardly from card platform 30 and defines the position of one edge of magnetic card 34 as it passes through the system.

Guide rail 36 extends substantially above ribs 32 to provide a guide surface 36a above platform 30 for engagement by a longitudinal edge of card 34. A plurality of bow springs 40 are attached by fasteners 42 to frame 22. Bow springs 40 resiliently urge magnetic card 34 against card guide surface 36a to accurately define the location of the card relative to platform 30. A stop member 46 is attached to platform 30 by suitable fasteners 48 at the rearward end of platform 30. Stop member 46 arrests the extended travel of magnetic card 34 as it is moved back and forth over the card transport system 20.

Bow springs 40 may be adjusted inwardly toward guide rail 36 to assure that magnetic card 34 maintains one edge in contact with card guide surface 36a during movement through the transport system. A guide plate 50 is attached to the forward end of frame 22 by screws 52 and guides card 34 onto platform 30.

A pair of locating arms 54 and 56 extend downwardly from frame 22. Arms 54 and 56 have a surface 58 and 60, respectively, facing inwardly toward the card transport system 20 which are accurately positioned relative to the inwardly facing card guide surface 36a. Four raised platforms 64 are formed on frame 22 and serve as receiving points for the attachment of tracking mount assembly 24 to frame 22.

Tracking mount assembly 24 includes a bridge frame 80 having four legs 82 extending downwardly from frame 80 for mating with platforms 64 on frame 22. Frame 80 is secured to frame 22 by bolts 86. Alignment lugs 88 and 90 extend downwardly toward frame 22 from frame 80. Frame 80 is adjustable on platforms 64 such that the outer facing surfaces 88a and 90a of lugs 88 and 90 may be positioned in surface contact with the card guide surface 36a. A stepper motor 94 is mounted to frame 80 along wall 96 and a lead screw 98 extends therefrom across frame 80 and is journaled into the opposite side of frame 80 at wall 100. Motor 94 is connected by electrical lead 102 and connector 104 to a control circuitry (not shown). A stop switch 106 is attached by suitable fasteners 108 to frame 80. A pinch roll assembly 110 is attached to the forward side of frame 80 and includes a pinch roller 112 rotatably mounted on a rod 114 which extends through roller 112 and through a U-shaped member 116 which is in turn supported from frame 80 by shaft 120. Pinch roll assembly 110 does not form a part of the present invention and is more fully disclosed in U.S. Pat. No. 3,942,789, entitled UNIFORM PRESSURE DISTRIBUTING SELF-LEVELING PINCH ROLL FOR MAGNETIC CARD TRANSPORT SYSTEM, and having the same assignee as the present application.

A guide shaft 122 is supported by frame 80 between walls 96 and 100 and is parallel to and in the same horizontal plane as lead screw 98. A location indicator 124 is attached to the upper face of the rearward portion of frame 80.

Magnetic head assembly 28 includes a magnetic head 126 attached to a magnetic head support 128. Magnetic head assembly 28 is receivable onto lead screw 98 and guide shaft 122 for stepped slidable movement across platform 30 by the actuation of stepper motor 94. An electrical lead 130 and connector 132 connects the magnetic head 126 to a control circuitry (not shown). Adjustable stop screws 134 and 136 are positioned on magnetic head assembly 28 in line with wall 96 of frame 80 and stop switch 106, respectively.

A BOC (Beginning of Card) and EOC (End of Card) sensor 140 of the photo-electric type is attached by a suitable fastener 146 to frame 22. Sensor 140 is connected by electrical lead 142 and connector 144 to a control circuitry (not shown). Front surface 83 of leg 82 serves as a positioning reference when attaching sensor 140 to frame 22 to ensure a controlled relationship between sensor 140 and the various other assemblies of the card transport system 20. Sensor 140 is bankpositioned against surface 83 for the purpose of position reference. When magnetic card 34 is inserted into the card transport system 20, the leading edge of card 34 enters slot 141 of sensor 140 and interrupts or blocks the ray or beam of light within the sensor 140 and initiates, through the control circuitry (not shown), the take-in of the magnetic card 34 into the card transport system 20 by the card drive assembly 26. When the trailing edge portion of the magnetic card 34 passes through slot 141 of sensor 140 and card 34 no longer blocks or interrupts the ray or beam of light within sensor 140, the control circuitry causes the card drive assembly 26 to stop the forward or inward movement of the magnetic card 34 such that the magnetic card 34 is in proper position for the record or read operation which is to follow. By the accurate placement and positioning of the sensor 140, the accurate and repetitive placement of the magnetic card 34 within the card transport system 20 by the card drive assembly 26 is assured.

Card drive assembly 26 includes a frame 150 having three ear extensions 152, 154 and 156 for adjustable attachment to frame 22. Attachment of frame 150 to frame 22 is by appropriate bolts through apertures in ears 152, 154 and 156 and into integral threads formed in the bottom face of frame 22. A DC motor 158 is attached to side wall 160 of frame 150 and has a drive shaft 162 operatively connected to a drive wheel 164. The end of shaft 162 remote from motor 158 is received in a coupling 166 which is in turn attached to a transducer 168. Transducer 168 is connected to a control circuitry (not shown) by electrical lead 170. Transducer 168 controls the distance and speed of the rotation of drive wheel 164 thereby controlling the movement of magnetic card 34 forward and back on platform 30. Platform 30 has an aperture 180 formed therein corresponding to the location of drive wheel 164 when frame 150 is attached to frame 22. A spring 174 is received within a receptacle 172 retained in ear 156 and bears against the underside of frame 22 when card drive assembly 26 is assembled to frame 22.

As has been discussed earlier, maintenance of a proper alignment between the magnetic head 126 and the magnetic card 34 on which the read and write functions are performed is of critical significance in magnetic card transport systems. The present system provides and maintains this controlled relationship by providing control positions between frame 80 of tracking mount assembly 24 relative to platform 30 and card guide rail 36. A controlled relationship is also provided between magnetic head assembly 28 and tracking mount assembly 24.

Figure 3:
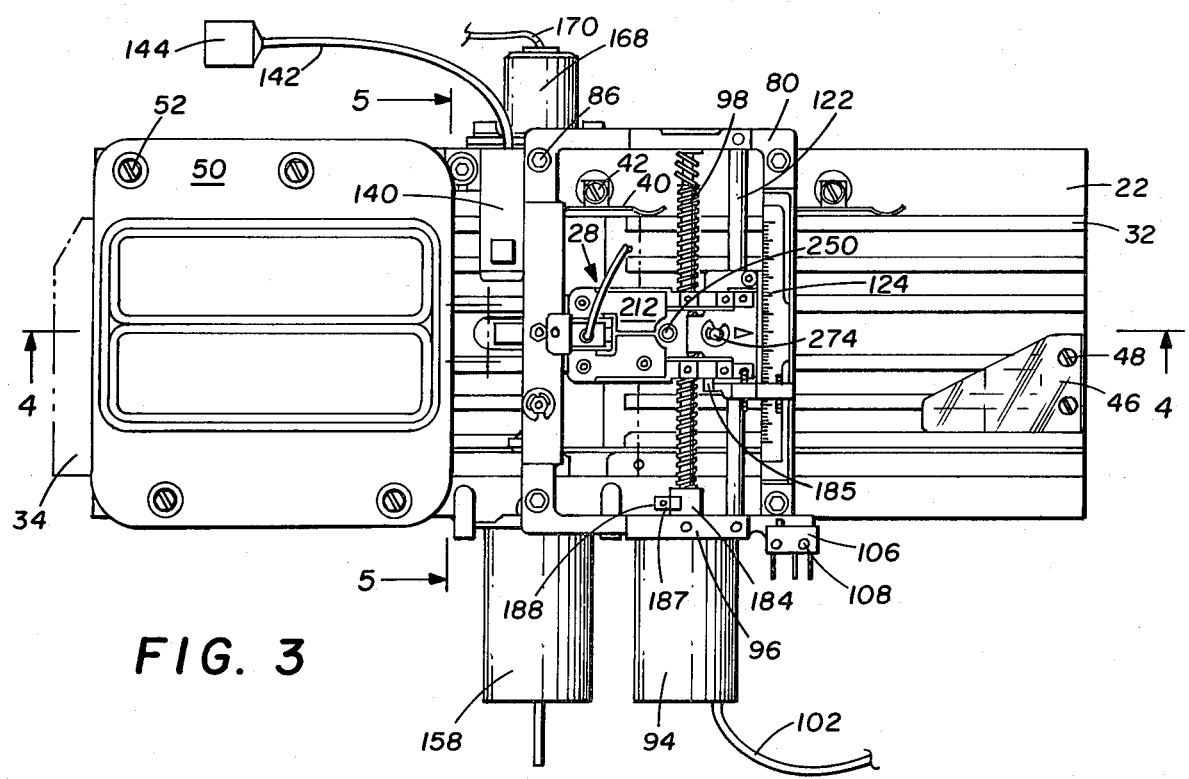
FIG. 3 is a top plan view of the card transport system illustrated in FIG. 1.
Figure 4:
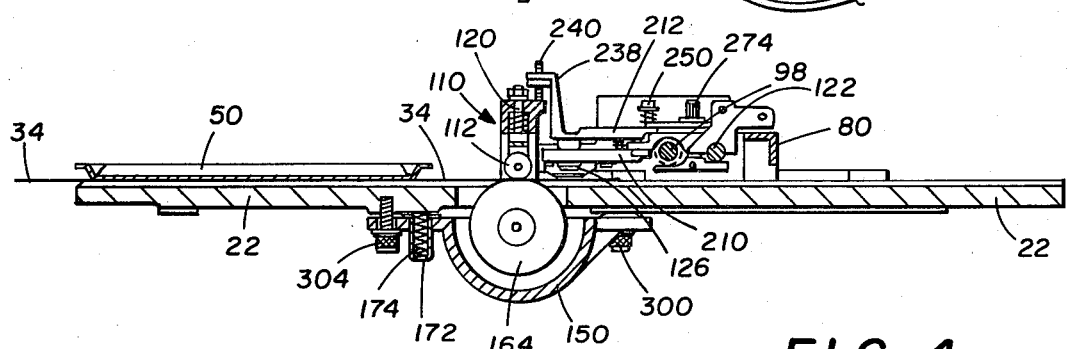
FIG. 4 is a simplified section view taken along lines 4—4 of FIG. 3 and looking in the direction of the arrows.
Figure 5:
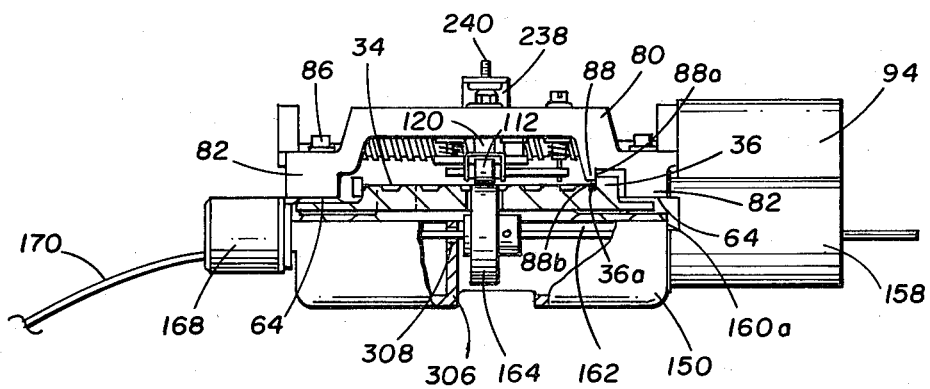
FIG. 5 is a simplified partially broken away section view taken along lines 5—5 of FIG. 3, looking in the direction of the arrows.

The controlled relationship between tracking mount assembly 24 and platform 30 and guide rail 36 is illustrated in FIGS. 1-5. Referring specifically to FIGS. 3-5 and particularly to FIG. 5, frame 80 from which stepper motor 94 and lead screw 98 and guide shaft 122 are supported, is mounted to platform 22 at legs 82 extending from frame 80. A pair of alignment lugs 88 and 90 extend downwardly from frame 80 and have orienting surfaces 88a and 90a (FIG. 2) as the surfaces which engage card guide surface 36a of card guide rail 36. By controlling the relationship of lugs 88, 90 and surfaces 88a and 90a which mate with the controlled guide surface 36a of rail 36, the position of frame 80, and thereby the position of lead screw 98 and guide shaft 122, may be automatically positioned relative to card guide surface 36a. As a result, lead screw 98 and guide shaft 122 are automatically positioned relative to a magnetic card fed onto platform 30 where the card is aligned with one edge bearing against surface 36a of guide rail 36. Additionally, lugs 88 and 90 provide a guide surface for the magnetic card 34 within the card transport system 20. A forward-facing radius of curvature 85b on the lower portion of lug 88 and a corresponding curvature (not shown) on lug 90 form guide surfaces that keep slightly curled magnetic cards 34 from rising above the curvature 85b and the corresponding curvature on lug 90. Card sensor 140 is not shown in FIGS. 4 and 5 to provide further clarity.

Moreover, the position of lead screw 98 and guide shaft 122 relative to the plane of the magnetic card 34 is automatically set and adjusted by properly dimensioning legs 82 supporting frame 80 from platforms 64 on frame 22.

The significance of such an arrangement may be appreciated when it is understood that lead screw 98 and guide shaft 122 may be positioned relative to frame 80 and thus relative to alignment lugs 88 and 90 and the alignment surfaces 88a and 90a during manufacture at the factory. In this way, the critical alignment necessary to properly position the components carried by tracking mount assembly 24 may be set prior to the assembly of the tracking mount assembly 24 on frame 22. Thereafter, the only alignment necessary in the field where a repair or replacement to any component of the tracking mount assembly is required entails only the simple alignment of alignment surfaces 88a and 90a of alignment lugs 88 and 90 against the guide surface 36a of card guide rail 36. Moreover, the mere positioning of frame 80 onto frame 22 by seating legs 82 onto platforms 64 automatically positions frame 80 and lead screw 98 and guide shaft 122 relative to the plane of magnetic card 34.

Magnetic head assembly 28 includes an adjustment indicator lug 180 including two indicator marks 182 which are used in conjunction with collar 184 and integral lug 188 secured to lead screw 98 to provide an adjustment reference for the adjustment of stop screw 136 which activates stop switch 106. The output of stop switch 106 provides an input to the control circuitry (not shown) whereby the control circuitry can control the stepper motor 94. Collar 184 and integral lug 188 is positioned at the end portion of lead screw 98 near stepper motor 94. The angular position of collar 184 and integral lug 188 with respect to lead screw 98 is determined with respect to the detent of stepper motor 94 and is adjusted and set at the factory. Once the collar 184 is factory adjusted, it serves as a limit stop and reference locator for the service life of tracking mount assembly 24.

In the adjustment of stop screw 136, stepper motor 94 is activated to move the magnetic head assembly 28 toward collar 184 until the adjustment indicator lug 180 is very close to collar 184 and surface 187 of lug 188 is in a vertical orientation and the projection of the line formed thereby is positioned between the two indicator marks 182. Stop screw 136 is then adjusted to activate stop switch 106.

Lead screw 98 is then rotated until lug 188 is near or just touching angular stop 185 located on magnetic head assembly 28. Stop screw 134 is then adjusted to a dead stop position against wall 96 of frame 80. A limit stop is provided for rotation of lead screw 98 by both stop screw 134 in contact with wall 96 and lug 188 in contact with angular stop 185.

Referring to FIGS. 6-9 wherein magnetic head assembly 28 is illustrated in more detail, magnetic head assembly 28 includes magnetic head 126 supported by magnetic head 128. Magnetic head support 128 includes a magnetic head unit 200 supporting magnetic head 126 and flexibly attached by resilient leaf springs 202 to a lead screw attachment unit 204. Magnetic head unit 200 includes a lower platform 210 adjustably connected to an upper platform 212. Magnetic head 126 is rigidly fixed in a clip 214 which is attached by screws 216 to lower platform 210. Clip 214 is made to permit the adjustment of the clip 214 and magnetic head 126 about an axis perpendicular to the plane of lower platform 210 through loosening screws 216 and rotating clip 214 relative to lower platform 210. In this way, the skew or azimuth of the magnetic head 126 may be adjusted relative to lower platform 210 and ultimately to the magnetic card used in conjunction with the magnetic head. Lower platform 210 is connected to upper platform 212 by bolts 220, 222, and 224. Bolt 222 passes through an aperture in lower platform 210 and is threadedly received in a boss 226 in upper platform 212. A rubber bushing 228 is positioned between the head of bolt 222 and lower platform 210, and the aperture through lower platform 210 is slightly larger than the threaded shaft of bolt 222 thereby permitting the rotation of lower platform 210 at the point of connection provided by bolt 222.

Bolts 220 and 224 pass through apertures in upper platform 212 and are threadedly received into lower platform 210. Compression springs 230 and 232 are positioned around the shafts of bolts 224 and 220 and between upper and lower platforms 210 and 212.

Figure 6:
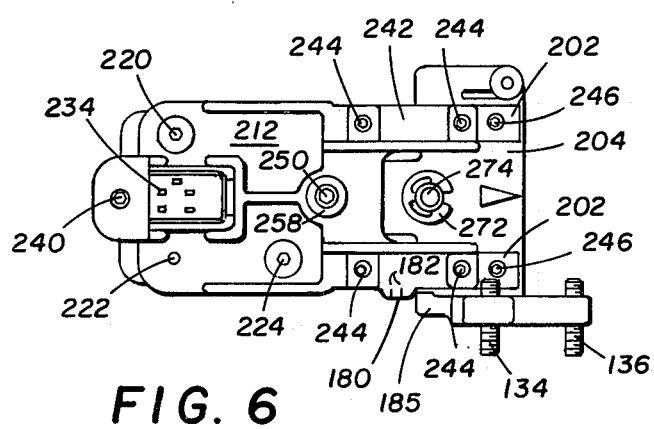
FIG. 6 is a top plan view of the magnetic head assembly of the present invention.
Figure 8:
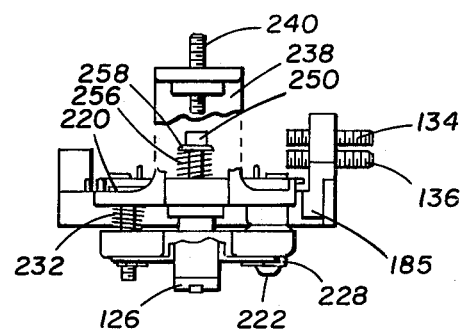
FIG. 8 is a front elevation partially broken away of the magnetic head assembly of the present invention.
Figure 7:
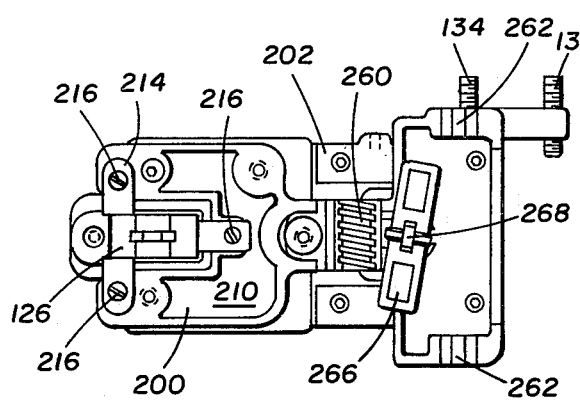
FIG. 7 is a bottom plan view of the magnetic head assembly of the present invention.

It will be noticed from FIGS. 6 and 7 that bolts 220 and 222 are in a plane perpendicular to the longitudinal axis of magnetic head 126 while bolts 222 and 224 are in a plane parallel to the longitudinal axis of magnetic head 126. As a result of this arrangement, by adjusting bolt 224, lower platform 210 is rotated about an axis transverse to the longitudinal axis of magnetic head 126 to adjust the pitch of the magnetic head. Alternatively, the adjustment of screw 220 rotates the magnetic head 126 about an axis parallel to the longitudinal axis of the magnetic head to adjust the magnetic head about its roll axis.

The magnetic head 126 is provided with electrical terminals 234 which in turn are connected by electrical lead 130 (shown in FIGS. 1 and 2) to appropriate control circuitry (not shown). Upper platform 212 is also provided with an upper extending arm 238 which supports an adjustment screw 240. When magnetic head assembly 28 is assembled to tracking mount assembly 24, adjustment screw 240 may be adjusted to contact frame 80 to raise and lower magnetic head 126 relative to the plane of the magnetic card 34 passing therebelow.

Upper platform 212 has two rearwardly extending arms 242 which are attached by suitable means such as rivets 244 to resilient leaf springs 202. Springs 202 are in turn attached by suitable means, such as rivets 246, to lead screw attachment unit 204.

The forward end of lead screw attachment unit 204 is attached to upper platform 212 of magnetic head unit 200 by a screw 250. Screw 250 passes through an aperture 252 in upper platform 212 and is threaded engaged into a boss 254 formed in the forward end of lead screw attachment unit 204. A compression spring 256 is contained between a cup washer 258 supported below the head of screw 250 and the upper surface of upper platform 212. Screw 250 may be adjusted to increase the resistance to upward rotation of magnetic head unit 200 about its connection to lead screw attachment unit 204. This resistance controls the pressure applied by magnetic head 126 against the magnetic card with which it acts.

Lead screw attachment unit 204 has a forward threaded portion 260 threaded to mate with the threads of lead screw 98. The attachment of lead screw attachment unit 204 to magnetic head unit 200 is such that the threads of threaded portion 260 are transverse to the longitudinal axis of the magnetic head assembly 28. Lead screw attachment unit 204 is also formed with guideways 262 for receiving guide shaft 122 therein. Guideways 262 are formed on an axis substantially parallel to the axis of the threaded portion 260 formed adjacent thereto in lead screw attachment unit 204. An engaging foot member 266 (shown in the open position in FIG. 7 and in the closed position in FIG. 9) is supported from a shaft 268 extending through an aperture in lead screw attachment unit 204 and biased upwardly by a compression spring 270 acting between a retaining washer 272 supported below head 274 of shaft 268 and lead screw attachment unit 204.

Figure 9:
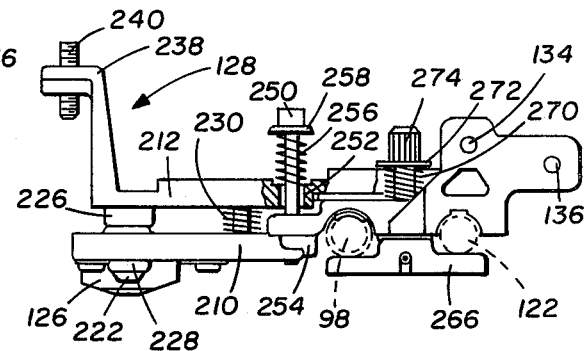
FIG. 9 is a side elevation partially broken away of the magnetic head assembly of the present invention.

FIG. 9 illustrates the magnetic head assembly 28 in its engaged position on lead screw 98 and guide shaft 122. The engagement is accomplished by engaging threaded portion 260 and guideways 262 of lead screw attachment unit 204 on lead screw 98 and guide shaft 122, respectively. Retaining foot member 266 is then engaged against the surfaces of lead screw 98 and guide shaft 122 opposite threaded portion 260 and guideways 262 of lead screw attachment unit 204. Retaining foot member 266 is biased upwardly to effectively clamp the magnetic head assembly onto the lead screw and guide shaft by the action of compression spring 270 biasing shaft 268 upwardly.

The present invention provides a magnetic head assembly which can be accurately adjusted in fixtures at the factory and easily assembled on a tracking mount assembly. By controlling the alignment of the tracking mount assembly to the magnetic card guide surface, the proper roll, pitch and skew or azimuth alignment of the magnetic head relative to the magnetic card is automatically assured. In operation of the present invention, the magnetic head assembly 28 is properly adjusted at the factory such that repair of the assembly requires only the removal of a defective head and the mounting of a replacement preadjusted head. The magnetic head 126 is adjusted by the adjustment of clip 214 relative to the lower platform 210. This adjustment is primarily an adjustment of the skew of the magnetic head 126. The roll and pitch of magnetic head 126 are adjusted relative to upper platform 212 of magnetic head unit 200 by the adjustment of bolts 220 and 224. Bolt 224 controls the adjustment for pitch while bolt 220 controls the roll of magnetic head 126. When magnetic head assembly 28 is fitted onto lead screw 98 and guide shaft 122 by the engagement of the assembly thereon and the engagement of retaining foot member 266 to lock the assembly thereon, the magnetic head is in controlled alignment with lead screw 98 and guide shaft 122. Moreover, this relationship is not effected by the wear experienced by foot member 266 through translation along the length of screw 98 as compression spring 270 automatically compensates for any wear resulting in foot member 266.

Magnetic head 126 is then brought into proper alignment with magnetic card 34 by the proper mounting of tracking mount assembly 24 onto frame 22. As previously discussed, tracking mount assembly 24 is automatically referenced relative to card guide surface 36a of card guide rail 36 by the engagement of surfaces 88a and 90a of lugs 88 and 90 extending from frame 80 of tracking mount assembly 24. Therefore, by the assembly of the tracking mount assembly and the magnetic head assembly onto frame 22, the relationship between magnetic head 126 and magnetic card 34 is controlled without the requirement of any field adjustment of the components. Additionally, the relationship of lead screw 98 to frame 80 and therefore to platform 30 is preset at the factory by energizing stepper motor 94 and rotating the motor, and thus the lead screw, to a proper relationship relative to the components in which it is assembled. This setting of lead screw 98 and stepper motor 94 relative to frame 80 is permanently marked thus presetting this adjustment for all future use of the stepper motor and frame combination. In operation, the electronic typewriter merely activates stepper motor 94 to return magnetic head assembly 28 toward stepper motor 94 until stop screw 136 engages stop switch 106 on tracking mount assembly 24. The control circuitry is then activated to appropriately step off the required number of steps to bring the magnetic head to track zero or any desired track position along the width of magnetic card 34.

Figure 10:
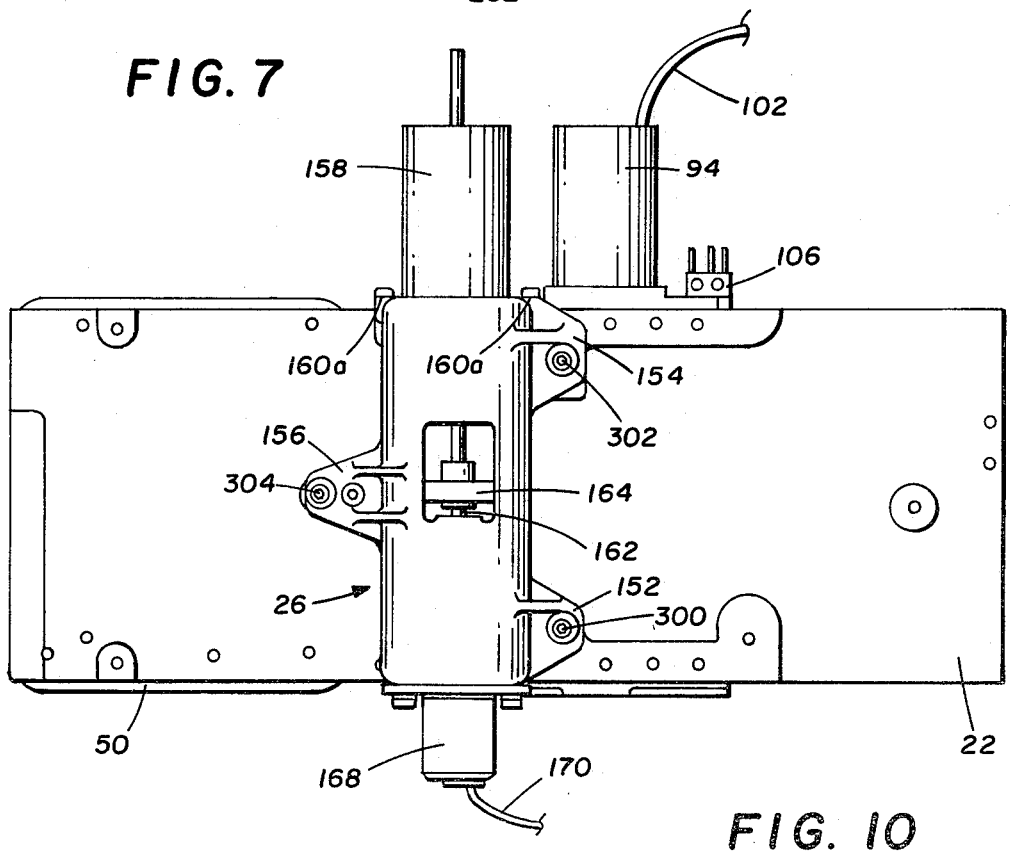
FIG. 10 is a bottom plan view of the magnetic card transport system illustrated in FIG. 1.

The relationship of the vertical adjustment of the magnetic head relative to the plane of the magnetic card is made by adjusting screw 240 on arm 238 of magnetic head unit 200. This adjustment is made to prevent the contact of the magnetic head with platform 30 when the magnetic card is not inserted into the system. The adjustment of the contact pressure applied by magnetic head 126 to the magnetic card 34 is governed by the spring rate of leaf springs 202 and controllable by the adjustment of bolt 250 to increase or decrease the force applied by compression spring 256 which resists the movement of magnetic head unit 200 relative to lead screw attachment unit 204 through the flexure of leaf springs 202. This capacity to control the contact pressure between the magnetic head and magnetic card makes possible the maintenance of the contact pressure below wearout levels. Moreover, proper contact pressure facilitates the reading and writing functions carried on by the magnetic head 126 and the magnetic card 34. 160a 36a Referring to FIGS. 4, 5 and 10, card drive assembly 26 is attached to the underside of frame 22 by bolts 300, 302 and 304 passing through apertures in ears 152, 154 and 156, respectively, and threadedly received into frame 22. As discussed earlier with respect to FIGS. 1 and 2, frame 150 supports a DC drive motor 158 with a drive shaft 162 extending therefrom and a drive wheel 164 keyed to shaft 162 for rotation therewith. Referring now to FIG. 5, drive shaft 162 is supported by a brace 306 extending from frame 150 which supports a bearing 308 in which drive shaft 162 rotates. Wall 160 of frame 150 supports a second bearing (not shown) for supporting shaft 162. These bearings are so positioned as to align shaft 162 perpendicular to the outer facing surface 160a of wall 160. This surface is made for abutting engagement with the inner facing surfaces 58 and 60 of legs 54 and 56, respectively, extending downwardly from frame 22. As has been previously mentioned, surfaces 58 and 60 of legs 54 and 56 form a plane parallel to the plane of surface 36a of card guide rail 36. Therefore, by simply butting surface 160a against surfaces 58 and 60 of legs 54 and 56 and tensioning bolts 300, 302 and 304 to secure frame 150 to frame 22, drive wheel axis 162 is positioned perpendicular to the longitudinal axis of the magnetic card aligned with its edge against card guide surface 36a. Therefore, drive wheel 164, rotating on shaft 162, is positioned such that its tangential rotation is aligned with the longitudinal axis of the magnetic card. As a result of this arrangement, when card drive assembly 26 is removed for repair or replacement, the only adjustment necessary to align the assembly is to assure the surface contact of surface 160a of wall 160 against surfaces 58 and 60 of legs 54 and 56 extending from frame 22.

Referring to FIG. 4, adjustment of drive wheel 164 such that the plane of the lower face of magnetic card 34 is tangential to the periphery of the drive wheel 164 is simply accomplished by the adjustment of screw 304 to pivot frame 150 about bolts 300 and 302. Compression spring 174 housed in receptacle 172 and acting between the cup and frame 22 biases frame 150 away from frame 22 and thereby cooperates with bolt 304 to make the adjustment. With these two adjustments, that is the skew alignment of drive wheel 164 and the vertical alignment of the drive roller 112, a magnetic card 34 may be driven by the rotation of drive wheel 164 as it is engaged between the drive wheel 164 and pin roll assembly 110 without deforming or lifting the card 34 and without being pulled away from card guide surface 36a as it is moved back and forth on platform 30.

Therefore, the present invention provides a system for the preset alignment of a tracking mount assembly frame, a magnetic head assembly and a card drive assembly relative to the card guide surface on a card support platform. Each of the components are either preset or predimensioned one relative to the other such that the components when assembled to the card support platform are automatically aligned relative to the magnetic card guide surface. This arrangement eliminates the field adjustments heretofore required thereby assuring more accurate alignment of the components of a card transport system while eliminating the time and labor required in field adjustment.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications, and substitutions of parts and elements as fall within the scope of the appended claims.

What is claimed is:

1. In a card transport system, a card tracking assembly comprising:
   a magnetic card support platform,
   a top surface formed on said magnetic card support platform, and having a card guide surface thereon adjacent to said top surface,
   a tracking mount frame,
   a lead screw mounted for selective rotation in said tracking mount frame,
   a guide shaft mounted in said tracking mount frame,
   a plurality of alignment lugs extending from said tracking mount frame and engageable with the card guide surface for aligning the lead screw and guide shaft relative to the card guide surface, and
   alignment faces formed on said alignment lugs, said alignment faces being in a first plane transverse to the longitudinal axis of said lead screw such that the engagement of said alignment faces with the card guide surface positions the longitudinal axis of said lead screw perpendicular to a second plane defined by the card guide surface.

2. The card tracking assembly of claim 1 further comprising: second alignment means for aligning said tracking mount frame relative to said card support platform whereby said lead screw and guide shaft are parallel to the plane of the top surface of said card support platform.

3. The card tracking assembly according to claim 2 wherein second alignment means comprises protruding legs extending from said card tracking frame and mountable on leg supports extending from the top surface of the card support platform.

4. The card tracking assembly of claim 1 further comprising:
   a stepper motor for driving said lead screw,
   means for adjusting the angular position of said stepper motor relative to said tracking mount frame such that the threads of said screw are aligned relative to the transverse axis of the card support platform.

* * * * *